(12) United States Patent
Steinberg et al.

(10) Patent No.: US 10,050,430 B2
(45) Date of Patent: Aug. 14, 2018

(54) SEALING THE CONNECTION POINT BETWEEN TWO CONDUCTORS

(71) Applicant: NEXANS, Paris (FR)

(72) Inventors: Helmut Steinberg, Stornstein (DE); Udo Mayer, Weiden (DE)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 15/314,401

(22) PCT Filed: Apr. 23, 2015

(86) PCT No.: PCT/EP2015/058752
§ 371 (c)(1),
(2) Date: Nov. 28, 2016

(87) PCT Pub. No.: WO2015/180898
PCT Pub. Date: Dec. 3, 2015

(65) Prior Publication Data
US 2017/0201084 A1    Jul. 13, 2017

(30) Foreign Application Priority Data

May 27, 2014 (EP) .................................... 14305790

(51) Int. Cl.
*H01R 4/00* (2006.01)
*H02G 15/18* (2006.01)
(Continued)

(52) U.S. Cl.
CPC ............ *H02G 15/18* (2013.01); *H01R 4/029* (2013.01); *H01R 4/182* (2013.01); *H01R 4/183* (2013.01); *H01R 4/70* (2013.01); *H01R 2201/26* (2013.01)

(58) Field of Classification Search
USPC ........ 174/84 R, 84 S, 85, 86, 88 S, 93, 77 R
See application file for complete search history.

(56) References Cited

U.S. PATENT DOCUMENTS 3,956,575 A * 5/1976 Sutherland ............. G01V 1/201
174/72 R
6,069,320 A * 5/2000 Rocci ....................... H01R 4/70
174/84 R
(Continued)

FOREIGN PATENT DOCUMENTS

| DE | 19741572 A | * 3/1993 | ............. H01R 13/52 |
| DE | 19741572 | 3/1999 | |
| WO | 2014006647 | 1/2014 | |

OTHER PUBLICATIONS

Search Report dated Jul. 7, 2015.

*Primary Examiner* — William H Mayo, III
(74) *Attorney, Agent, or Firm* — Sofer & Haroun, LLP

(57) ABSTRACT

A device (1) covers the connection point (10) between two elongate, electrically conductive components (11, 12) in a moisture-tight manner. The device has a tubular sleeve (2) that surrounds the connection point (10). In the mounted position, a sealing element (3, 4) is attached to each of the two axial ends of the sleeve (2), which sealing element closes the sleeve (2) and lies tightly against the wall of the sleeve and has a feed-through (13, 14) for one of the electrically conductive components (11, 12), which feed-through is matched to the shape of the electrically conductive component (11, 12) in such a way that said electrically conductive component is tightly surrounded. In the mounted position, a cover (5, 6) that encompasses the sleeve and the sealing element (3, 4) located in the sleeve is attached to each of the ends of the sleeve (2), which cover has a feed-through (15, 16) for one of each of the electrically conductive components (11, 12). In the mounted position, the covers (5, 6) are attached to the sleeve (2) where each of the sealing elements (3, 4) is clamped between the cover (5, 6) and the sleeve (2).

10 Claims, 2 Drawing Sheets

(51) Int. Cl.
  *H01R 4/70* (2006.01)
  *H01R 4/02* (2006.01)
  *H01R 4/18* (2006.01)

(56) References Cited

U.S. PATENT DOCUMENTS

| | | | |
|---|---|---|---|
| 6,444,914 B1 * | 9/2002 | Su | H01R 13/59 174/84 R |
| 7,431,602 B2 * | 10/2008 | Corona | H01R 13/5205 439/272 |
| 2013/0171853 A1 * | 7/2013 | Tsujii | H01R 13/4223 439/271 |

* cited by examiner

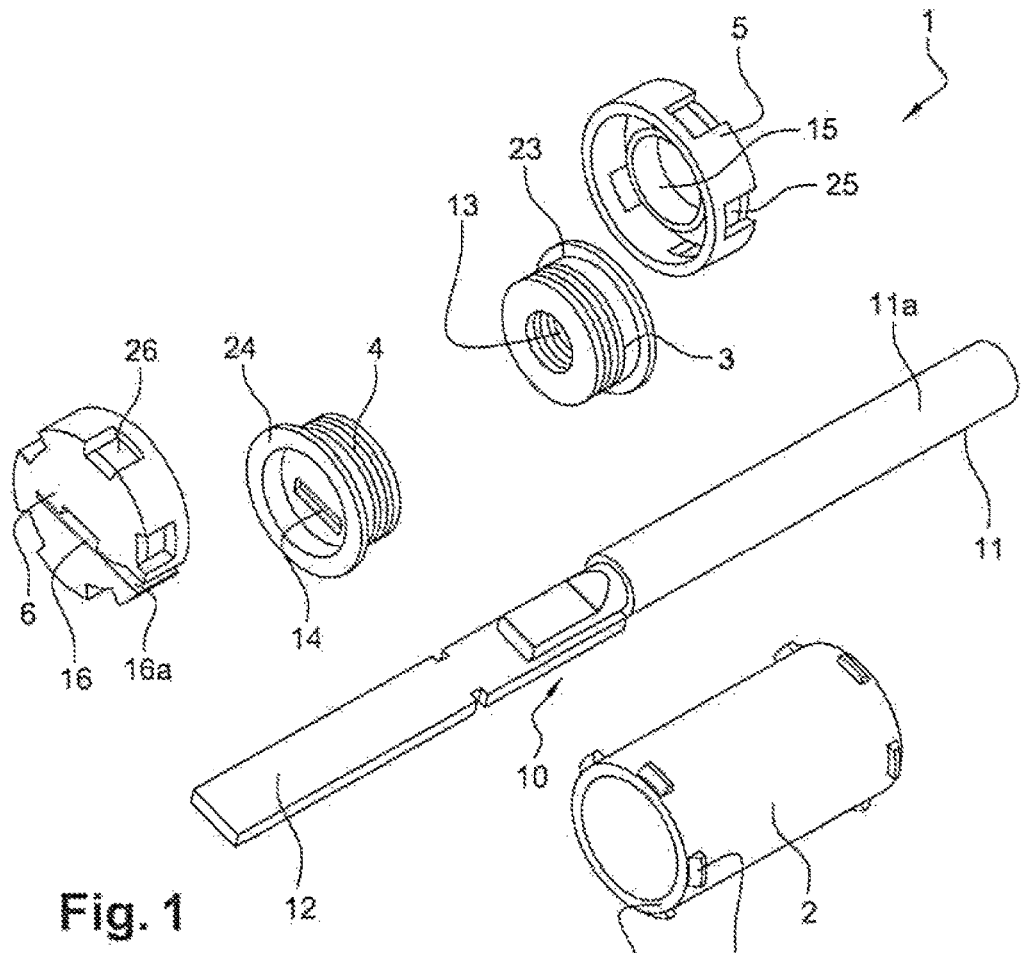
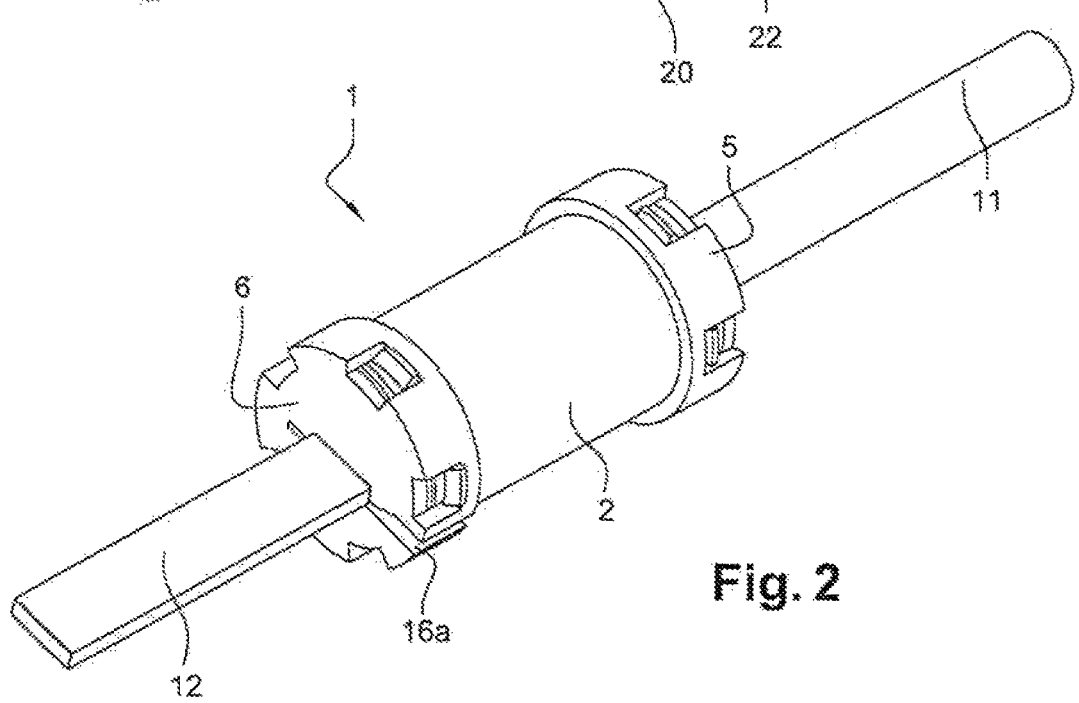

SEALING THE CONNECTION POINT BETWEEN TWO CONDUCTORS

The invention relates to a device for covering the connection point between two elongated electrically conductive components in a moisture proof manner which has a tubular sleeve that surrounds the connection point, as well as a method for covering the connection point in a moisture proof manner.

In the following, individual electrical conductors should be designated "electrically conductive components," for example individual stranded conductors, also as solid conductors, for example cable shoes or other contact elements.

In electro-technology and especially in automotive electronics many individual electrical conductors with the attached contact elements composed of electrically conductive material are used to establish an electrical connection to actuators, sensors, control elements, batteries, etc. Also, individual conductors, for example an aluminum conductor and a copper conductor, can be connected to each other by a connector. In most cases these are flexible insulated stranded conductors. The individual conductor and the contact element are connected by the type of connection and/or connected integrally with each other.

In most cases the contact element and the conductor or the two conductors connected to each other are composed of different metals (for example aluminum and copper), so that at the contact point where the conductor is stripped and both metals are exposed, moisture due to the different electrochemical standard potential of the metal can lead to contact corrosion. As a result, corrosion has an increased contact resistance between the conductors and, furthermore, can interfere with the strength of the metallic connection.

To prevent this type of malfunction, the connection point between the two electrically conductive components must be sealed in a medium tight manner. The devices and methods for sealing the contact points between two electrical components are known.

For example, a shrinkable sleeve can be brought around the connection point, which is provided with a hot melt adhesive on its inner side and by heating shrinks around the connection point. The material connection of the shrinkable sleeve and the adhesive is, however for example, not optimally resistant against strong temperature fluctuations which, for example, occur in automobiles where the conductor can be exposed.

The connection point can be sprayed directly with a plastic in a special injection molding process to form an insulated body around the connection point. Also, this type of sealing does not do well with large temperature fluctuations.

The previously mentioned methods have in common that the sealing of the connection point against moisture and other environmental influences, in every case, is not adequate and satisfactory.

The shrinking sleeve and the spraying process also have the disadvantage that they are relatively time consuming, costly and not optimally suitable for individual conductors.

U.S. Pat. No. 6,069,320 A discloses a covering tube for spliced material which is closed by means of rubber seals as well as screw caps. The ends of the sleeve are each compressible, so that the rubber seals will be radially pressed together by the unscrewing of the cover.

The object of the invention is to produce an improved device and method of sealing, which makes possible a simple mounting and processing in production and a correct temperature resistant sealing of the connection point between two electrically conductive components.

This object is met according to the invention that in the mounted position
- on both axial ends of the sleeve a sealing element is attached on each that closes the sleeve and lies tightly on the wall of the same and that has a throughhole for one each of the electrically conductive components, which is adapted to the shape of the corresponding electrically conductive component so that the same is tightly enclosed,
- on the ends of the sleeve a cover is attached on each, the cover surrounding the sleeve and the sealing element arranged therein and having a throughhole for one each of the electrically conductive components, and
- the covers are attached to the sleeve in such a way that each of the sealing elements is clamped between the cover and the sleeve.

The device according to the invention and the method according to the invention makes possible a secure water tight sealing of the connection point of the two electrically conductive components. In the mounted position the device produces a medium proof area around the connection point. The sealing device is especially robust. The sealing element encloses the electrical components tightly and simultaneously is fitted to the diameter of the sleeve, so that the sealed area around the connection point is formed out of a frictional engagement connection between the sleeve, sealing elements and electrical components. With the device, according to the invention, the sealing element will primarily be axially compressed. That happens in each case through the clamping of the sealing element between the edge of the sleeve and the cover. The advantage of such a device is that the quality of the sealing is independent of the content and geometry of the sleeve. The device according to the invention is therefore advantageously usable with high temperatures or temperature fluctuations or high voltage devices. The device is, for example, especially suitable for use in motor vehicles. Further, the device according to the invention is mountable and, also removable. Therefore, advantageously, for example, it is especially simple to carry out repairs and overhauls of connection links already in use.

An embodiment of the subject matter of the invention is shown in the drawings.

In the drawings:

FIG. 1 is a single view of a part of the device according to the invention in accordance with a previous embodiment.

FIG. 2 shows the device in accordance with the previous embodiment in the mounted position.

In the illustrations, the same reference numbers refer to the same technical features.

Figure 3:
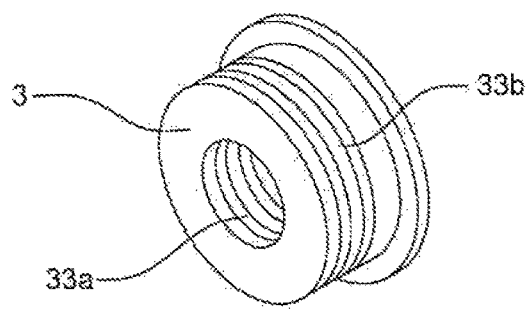
FIG. 3 shows a sealing element of the device according to the invention.
Figure 4:
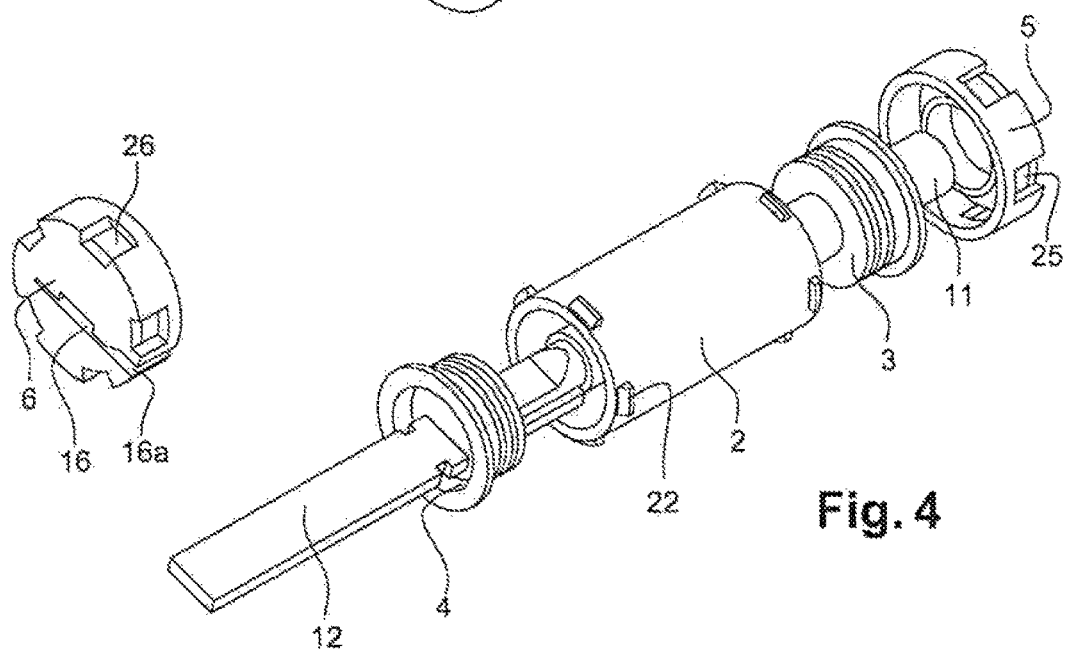
FIG. 4 shows the device in accordance with the previous embodiment during a mounting step.
Figure 5:
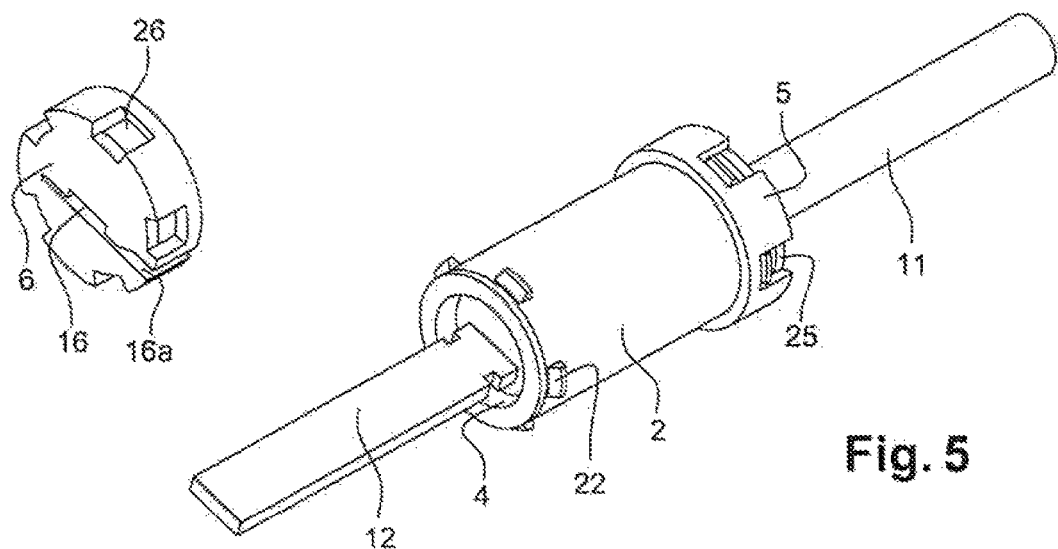
FIG. 5 shows the device in accordance with the previous embodiment during a further mounting step.

FIG. 1 shows the elements of the device according to the invention in accordance with a preferred embodiment in a single representation to provide a better overview. In FIG. 2 the device in accordance with the embodiment is shown in the mounted position. FIG. 3 shows in an enlarged view a sealing element of the device according to the invention according to FIG. 1 and FIG. 2. FIGS. 4 and 5 show the device according to the invention during mounting of the same.

The connection point 10 to be sealed is formed by a single conductor 11 and a contact element 12. The single conductor 11 is surrounded by an insulation 11a which has been removed from the end of the conductor 11. The two electrical components can, for example, be pressed, welded or with another method connected with each other. For example, the contact element 12 can be composed of copper and the single conductor can be composed of aluminum. The connection can also be produced between two single conductors or -wires, for example between an aluminum and a copper conductor.

The device 1 has a tubular shaped sleeve 2 surrounding the connection point 10 in the mounted position. The sleeve 2 is composed, for example, out of a temperature resistant plastic. Further, the device 1 includes two sealing elements 3, 4. In the mounted position, the sealing elements 3, 4 lie tightly against the walls of the sleeve 2 and extend into the sleeve. Each of the sealing elements 3, 4 has a throughhole 13, 14 for one of each of the two electrical components 11, 12. In the illustrated embodiment, the shape of the throughhole 13 of the first sealing element 3 is adapted to the cross section of the single wire 11, and the shape of the throughhole 14 of the second sealing element 4 is adapted to the cross section of the contact element 12. Therefore, it is ensured that each of the components 11, 12 is tightly guided through the throughholes 13, 14, tightly surrounded by each sealing element 13, 14. In the case of the single wire 11, the sealing element 3 lies tightly on the insulation 11a of the same. Because of the adapted form of the sealing elements 3, 4 to the electrical components 11, 12 and the sleeve 2, the sealing elements 3, 4 sit tightly inside the device 1 and securely maintain their position on each of the electrical components 11, 12.

The sealing elements 3, 4 are advantageously composed of an elastic solid material. Examples for such a material are rubber and silicone. These materials are especially very heat resistant. The sealing element 3, 4 therefore allow an effective sealing over wide temperatures ranges.

In the illustrated embodiment, the sealing elements 3, 4 have the shape of rings. These rings can, for example, have each on their inner and on their outer diameter lamella like projections 33a, 33b. The lamella like projections 33a, 33b are especially suitable to compensate eventual deviations between the dimensions of the cross sections of the electrical components and the respective throughholes 13, 14, without the quality of the seal being impaired. Furthermore, this provides a satisfactory, non-slip placement of the sealing elements 3, 4 in the sleeve 2. The sealing elements 3, 4 further have each a ridge 23, 24 which has a larger outer diameter than the rest of the rings. The ridge 23, 24 lies each on the edge 20 at the ends of the sleeve 2. In the area of the ridge 23, 24, the sealing elements 3, 4 are axially compressed. Through the cooperation of the axial and radial compression, the sealing efficiency of the sealing elements 3, 4 is especially high.

According to the preferred embodiment the device 1 further includes two covers 5, 6. The covers 5, 6 serve as closing means of the device 1. The sleeve 2 provided with the sealing elements 3, 4 will be closed on each end with the covers 5, 6. The covers 5, 6 therefore have, as well as the sealing elements 3, 4, each a throughhole 15, 16 for one of the electrical components 11, 12. In the illustrated embodiment the shape of the throughhole 15 of the first cover 5 corresponds with the cross section of the single wire 11 with the insulation 11a, and the shape of the throughhole 16 of the second cover 6 corresponds with the cross section of the contact element 12. The second cover 6 has a slit 16a which extends from the edge of the cover 6 up to the throughhole 16. The slit 16a allows the side application of the cover 6 onto the contact element 12 so that it must not be pushed in the axial direction with the throughhole 16 onto the contact element 12, in case the contact element 12 has a varying diameter. In contrast to the sealing elements 3, 4, the adaption of the throughholes 15, 16 does not have to lead to medium tightness. The covers 5, 6 additionally maintain the sealing elements 3, 4 in the mounted position and ensure that the device 1 also remains intact under tensile stress.

In the illustrated embodiment, the covers 5, 6 can be found fastened on the sleeve by means of a bayonet lock. For this, the sleeve 2 has projections 22 which can be guided to the corresponding slits or grooves (with the reference numbers 25, shown in this) of the cover 5, 6. The covers 5, 6 are especially suitable to clamp the ridge 23, 24 of the sealing element 3, 4 between the edge 20 of the sleeve 2 and the covers 5, 6 and to deform it slightly. In this way, the placement of the sealing element 3, 4 inside the device 1 is especially tight and secure.

The cover 5, 6 can also by means of other types of closures be secured on the sleeve 2, for example, by means of a threaded closure or a clip closure.

According to a further embodiment the sleeve can be composed of two halves dividing the sleeve lengthwise. These can for example, be connected to each other along the longitudinal direction of the connection point 10 with a film hinge so that the sleeve is open and closable. The sleeve halves can then, for example, be sealed against each other by means of a continuous seal so that in the mounted position the seal forms a closed tube shaped unit.

The method according to the invention will be explained based on the following illustrated embodiment of the device 1 in FIGS. 1 to 5. Initially, the first cover 5 and the first sealing element will be brought up on the insulation 11a of the first electrical conductor 11. Then the single wire 11 will be connected to the contact element 12 and the sleeve 2 will be pushed over the connection point 10. Lastly, the second sealing element 4 will be brought up on the contact part 12 connected with the single wire 11 (FIG. 4). The sealing elements 3, 4, will be put into the sleeve 2 so that a sealed area is created around the connection point 10. The first cover 3 will be placed tightly on the sleeve (FIG. 5). Finally, the second cover 6 will be applied to the contact element 12 and placed tightly in an anti-slip manner on the contact element 12 and on the sleeve 2 (FIG. 2). In the illustrated embodiment the sleeve 2 together with the first cover 5 placed tightly thereon and the first sealing element 3 will be driven into the second cover 6 until the bayonet lock engages.

If the two electrically conductive components 11, 12 are single wires, the sealing elements 3, 4, and as necessary the covers 5, 6 will be each pushed on an electrical component and the sleeve 2 on one of the electrical components, before the components can be connected to each other.

The invention claimed is:

1. Device for covering the connection point between two elongated electrically conductive components in a moisture proof manner which has a tubular shaped sleeve that surrounds the connection point, wherein, in the mounted position on both axial ends of the sleeve, a sealing element is attached on each that closes the sleeve and lies tightly on the wall of the same and that has a throughhole for one each of the electrically conductive components, which is adapted to the shape of the corresponding electrically conductive component so that the same is tightly enclosed, wherein on the ends of the sleeve, in the mounted position, a cover is attached on each, the cover surrounding the sleeve and the sealing element arranged therein and having a throughhole for each one of the electrically conductive components, and the covers are attached to the sleeve in such a way that each of the sealing elements is clamped between the cover and the sleeve, wherein the sealing elements have the shape of rings, which have each on their inner and on their outer diameter lamella like projections, which provide a non-slip placement of the sealing elements in the sleeve, and wherein each sealing elements has a bulb which has a larger outer diameter than the rest of the rings and which lies each on the edge at the ends of the sleeve.

2. Device according to claim 1, wherein the electrically conductive components are a contact element and an electrical conductor.

3. Device according to claim 1, wherein the electrically conductive components are two electrical conductors.

4. Device according to claim 1, wherein each of the sealing elements extends in the sleeve in the mounted position and has a ridge which lies tightly on the wall of the sleeve.

5. Device according to claim 1, wherein the covers are attached on the sleeve by a threaded closure or by a bayonet lock.

6. Device according to claim 1, wherein the sealing elements are composed of silicone or rubber.

7. Device according to claim 1, wherein the sleeve is composed of two halves which are connected in the longitudinal direction with a film hinge.

8. Method to cover the connection point in a moisture tight manner between two elongated electrically conductive components by means of a tubular shaped sleeve surrounding the connection point, wherein a first sealing element is pushed on the first of the electrically conductive components, a second sealing element is pushed on the second of the electrically conductive components, the sleeve is so arranged that the sealing elements in the mounted position close each an axial end of the sleeve and lie tightly on the wall of the same, whereby the first sealing element has a throughhole for the first electrically conductive component and the second sealing element has a throughhole for the second electrically conductive component, whereby the throughholes are so adapted to the form of one each of the electrically conductive components that in the mounted position the same is tightly enclosed, whereby on the ends of the sleeve, in the mounted position, a cover is attached on each, the cover surrounding the sleeve and the sealing element arranged therein and having a throughhole for each one of the electrically conductive components, whereby the covers are attached to the sleeve in such a way that each of the sealing elements is each clamped between the cover and the sleeve wherein the sealing elements have the shape of rings, which have each on their inner and on their outer diameter lamella like projections, which provide a non-slip placement of the sealing elements in the sleeve, and wherein each sealing elements has a bulb which has a larger outer diameter than the rest of the rings and which lies each on the edge at the ends of the sleeve.

9. Method according to claim 8, wherein the first electrically conductive component is connected with the second electrically conductive component after the first sealing element is pushed on the first electrically conductive component and before the second sealing element is pushed on the second electrically conductive component.

10. Method according to claim 8, wherein the first electrically conductive component is connected with the second electrically conductive component, after the first sealing element is pushed on the first electrically conductive component and the second sealing element is pushed on the second electrically conductive component.

* * * * *